Figure 2:
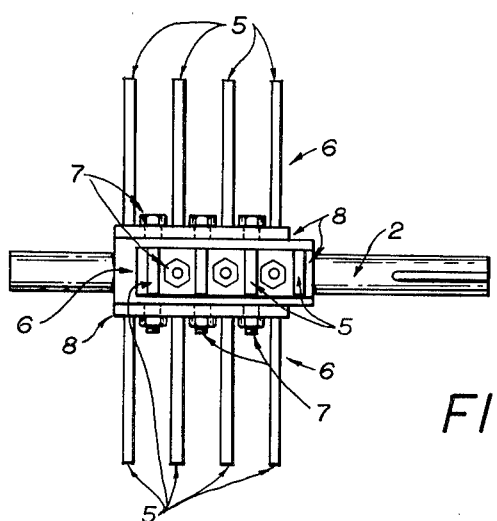

Feb. 15, 1966   R. W. JOHNSON ETAL   3,235,012
SEED BED SHAPING AND TILLING DEVICE
Filed April 13, 1964   2 Sheets-Sheet 1

INVENTOR.
ROY W. JOHNSON
BERNELL H. JOHNSON
BY
Townsend and Townsend
ATTORNEYS

Feb. 15, 1966 R. W. JOHNSON ETAL 3,235,012
SEED BED SHAPING AND TILLING DEVICE
Filed April 13, 1964 2 Sheets-Sheet 2

INVENTOR.
ROY W. JOHNSON
BURNELL H. JOHNSON
BY Townsend and Townsend
ATTORNEYS

United States Patent Office 3,235,012
Patented Feb. 15, 1966

1

3,235,012
SEED BED SHAPING AND TILLING DEVICE
Roy W. Johnson and Bernell H. Johnson, Woodland, Calif., assignors, by mesne assignments, to Johnson Farm Machinery Co., Inc., Woodland, Calif., a corporation of California
Filed Apr. 13, 1964, Ser. No. 359,011
4 Claims. (Cl. 172—157)

This invention relates to farm equipment. In the preferred embodiment, it relates to an earth tiller in combination with a seed bed shaping plate to be used in combination with planting and cultivating devices of a type such as that disclosed in applicant's Letters Patent No. 3,128,-833 dated April 14, 1964.

More particularly, this invention relates to cover plates designed to be mounted on equipment which is drawn through a field and which shapes the furrows and seed beds therebetween, said cover plates shaping the top of the seed beds. The device of this invention is a tiller mounted on and in combination with such a cover plate whereby the device tills the seed bed as well as shapes it.

Before planting row crops it may be desirable to till the seed beds and it is desirable to incorporate into or mulch the seed beds with chemicals such as fertilizers and weed killers. This incorporation or mulching is usually accomplished by first applying to the bed the desired chemicals and then incorporating the chemicals into the bed by a raking or tilling action usually provided by teeth mounted on a rotating axle. By preparing a seed bed in this way immediately prior to planting, an improved growth is secured in the crop.

Briefly described, the invention disclosed in applicant's Letters Patent No. 3,128,833 is a frame mounted on pontoons which, when drawn through a field, forms and shapes furrows and seed beds therebetween. This is accomplished by means of the pontoons whose bottoms shape the bottom of the furrows and whose sides shape the sides of the seed beds, and by means of cover plates which span adjacent pontoons and are removably attached thereto. These cover plates form and shape the tops of the seed beds. Once the invention described therein has formed the seed beds and furrows, it may be used again, by removing the cover plates, as an extremely accurate cultivating sled in that the furrows and seed beds will accurately guide the same pontoons by which they were formed.

Such a planting and cultivating device presents a problem, however, when the use of a rotary tiller or incorporator is desired because the tiller or incorporator tends to destroy a seed bed in that the rotating teeth tend to break down the sides of the bed as well as to throw clods into the furrows adjacent the beds. This action, of course, tends to destroy the clean lines of bed and furrow necessary to provide accurate guidance for the planting and cultivating device when it is drawn through the field to cultivate the crops previously planted by the device. For this reason, it has been found that tillers or incorporators supported on the frame of the planting and cultivating device in a position directly behind the cover plates spanning adjacent pontoons are not very satisfactory.

Furthermore, a primary advantage of the planting and cultivating device is highly accurate seed placement in that a seed planting device may be suspended from the frame of the planting and cultivating device directly behind the cover plates spanning adjacent pontoons of the device. This advantage is greatly reduced if tillers or incorporators must be suspended from the frame between the cover plates and the seed planting devices because the distance between cover plates and seed planting devices must then necessarily be increased. Any such increase in distance between cover plate and seed planting device reduces the accuracy of seed placement.

Moreover, the necessity for using a separate tiller or incorporator suspended from the frame of the planting and cultivating device reduces the advantage of the planting and cultivating device in its simplicity of a convertibility from a planter to a cultivator. That is, the operator of the device, to convert it from planter to cultivator, must remove not only the cover plates and the seed planters, but the tiller or incorporator as well.

While the present invention is, in its preferred embodiment, used in combination with the planting and cultivating device described in applicant's Letters Patent No. 3,128,833 it may be adapted for use with other types of devices which are designed to be drawn through a field to shape seed beds.

The principal object of the present invention therefore is to provide a cover plate and tilling device to be used in combination with a seed bed shaping device which not only will shape and form a seed bed but which will also till the seed bed to permit incorporation of chemicals into the bed as formed, while, at the same time, maintaining the shape and form of the bed.

Another object of the present invention is to provide a device to be used in combination with a seed bed shaping device which not only will shape a seed bed and provide for incorporation of chemicals into the bed but also will allow a seed planting device to be supported on the frame of the seed bed shaping device closely behind the present invention and thus make possible exceedingly accurate seed placement.

A further object of the present invention is to combine in one device a cover plate and a tiller for use on a planting and cultivating device such as that disclosed in the applicant's Letters Patent No. 3,128,833 in order to make easier the convertibility of the planting and cultivating device from a planter to a cultivator and back again to a planter.

Other objects of the present invention will become apparent upon reading the following specification and referring to the accompanying drawings.

Figure 1:
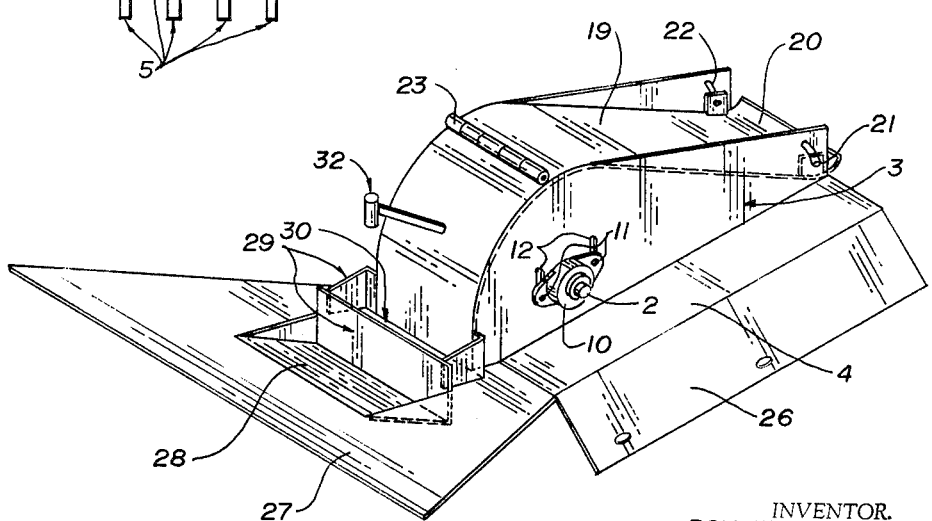
Figure 3:
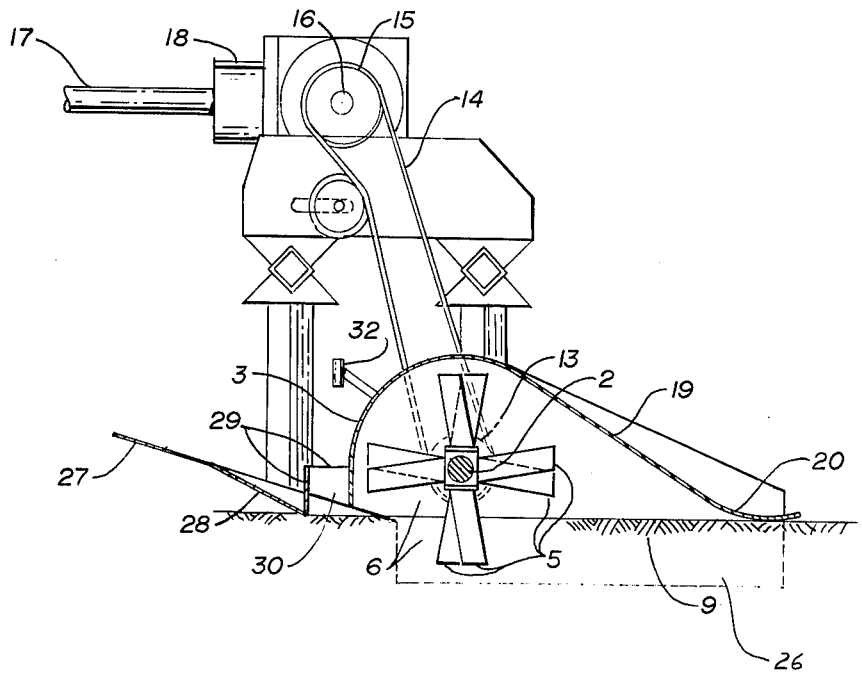
Figure 4:
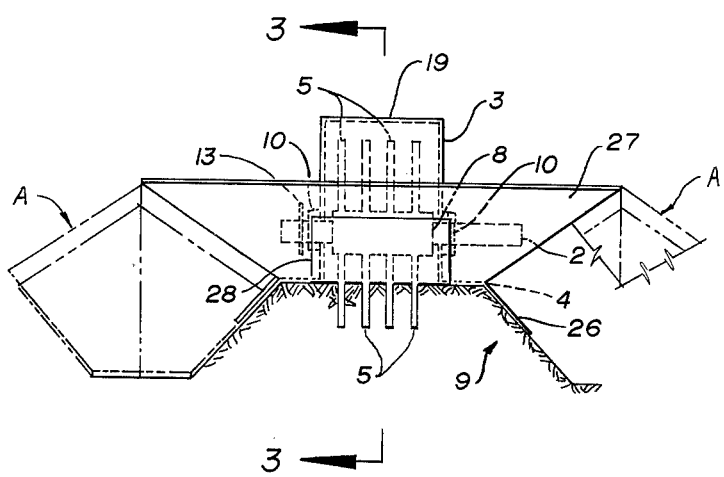

In the drawings:
FIGURE 1 is a perspective view showing the seed bed shaper and the earth tilling means mounted therein.
FIGURE 2 is a plan view showing the earth tilling means.
FIGURE 3 is a partial sectional view taken across line 3—3 of FIG. 4 and further including the drive mechanism of the earth tilling means.
FIGURE 4 is an end view of the seed bed shaping and tilling device.

The present invention employs an axle 2 mounted within a hood 3 which is in turn mounted on cover plate 4. Mounted on axle 2 are teeth 5. In the preferred embodiment of the invention, as illustrated in the accompanying drawings, four rows of teeth 6, each row bearing four teeth, are mounted on axle 2. Each row of teeth are mounted on a base plate 8. The rows of teeth 6 preferably are secured to axle 2 by means of bolts 7 which pass through axle 2 and base plates 8 of opposite rows of teeth. As is also illustrated in the accompanying drawings, the teeth in each row preferably are staggered so that adjacent teeth do not pass through seed bed 9 in the same plane. If teeth 5 are designed so that adjacent teeth pass through the bed in the same plane, the adjacent teeth tend to throw out large clods of earth which are engaged simultaneously by the teeth. The staggered arrangement sharply reduces this tendency. In the preferred embodiment, teeth 5 are shaped and hardened so that either edge may be used as the leading or incorporating edge. In this preferred embodiment, the rows of teeth 6 may each be reversed by merely removing bolts 7 and turning rows 6 around. As illustrated in the accompanying drawings, both ends of axle 2 are mounted in bearings 10 which are in turn secured to hood 3 by bolts 11. Slots 12 in hood 3 allow bearings 10 to be slidably adjusted in a vertical manner thus making adjustable the height of axle 2 above seed bed 9. Mounted on one end of axle 2 is sprocket 13. Sprocket 13 and thus axle 2 are driven by chain 14 which is in turn driven by sprocket 15 mounted on axle 16. Axle 16 is driven by the power take-off 17 from the tractor through gear box 18. It is understood that other means of propulsion may be used. For example, the design of the planting and cultivating device may allow a single axle to be used on which to mount each device of the present invention instead of separate axles for each device of the present invention. Such a single axle might be driven directly from the power take-off through a gear box or might be driven by a chain and sprocket arrangement wherein a second axle is used to take power from the power take-off then to transmit that power through the chain and sprocket to the axle on which each of the devices of the present invention are mounted.

Hood top 19 deflects downward earth thrown back by the rotating teeth and then repacks and reshapes seed bed 9 by means of the trailing area 20 of hood top 19 passing over seed bed 9. In this preferable embodiment as illustrated in the accompanying drawings, trailing area 20 is adjustable in height by means of bolts 21 and slots 22 as shown. This adjustability feature makes it possible to set trailing area 20 at a position which will give seed bed 9 the desired compactness. In this preferable embodiment, as shown and illustrated in the accompanying drawings, hood top 19 is designed to slant downward at a shallow angle so as to sharply reduce the tendency of the earth thrown by teeth to stick to the underside of hood top 19. In this preferred embodiment, the underside of hood top 19 is lined with a substance such a Dupont Teflon which has a low co-efficient of friction and which is both pliable and durable so as to withstand the effect of earth and rock being hurled against it. The low co-efficient of friction further reduces the tendency of the earth to stick to the underside of hood top 19. Hood top 19 is preferably hinged as shown by hinge 23. Hinge 23 allows hood top 19 to swing upward around hinge 23 after bolts 21 are removed. So opening the cover allows for inspection of teeth 5 as well as the underside of hood top 19.

Extending outwardly from the sides of the hood at its base is cover plate 4. Cover plate 4 packs and smooths that part of the seed bed 9 which lies between the edges of the bed and that part of the bed over which teeth 5 pass. Extending downwardly from the outer edges of cover plates 4 are side plates 26. Side plates 26 prevent the sides of seed bed 9 from being deformed by the downward pressure exerted on the seed bed by cover plate 4 and trailing area 20 of hood top 19. It is understood that this function may be performed by other means. For example, the pontoon such as described in applicant's Letters Patent No. 3,128,833, upon which the device of the present invention may be mounted, may be extended in length to a point opposite trailing area 20 of hood covering 19.

Attached to the leading edge of cover plate 4 and extending forwardly and upwardly therefrom is front plate 27. Front plate 27 channels the earth of the seed bed and forces it under cover plate 4 or through rotating teeth 5. In this preferred embodiment, as illustrated in the accompanying drawings, front plate 27 includes deflector shield 28, windshield 29 and opening 30. Opening 30 allows the chemicals that are to be incorporated into the soil to be applied to the ground directly in the path of rotating teeth 5. Windshield 29 extending upwardly from front plate 27 prevents wind from blowing the chemicals which are being sprayed through opening 30. Deflector shield 28 deflects downward the earth passing under front plate 27 and thereby prevents the earth from being forced up through opening 30.

The device of the present invention provides for support of a chemical bearing applicator by means of bracket 32 secured to the forward part of hood 3. The end of bracket 32 overhangs opening 30. An applicator used to carry the chemicals may be secured to bracket 32. A nozzle may be used on such an applicator to insure that the chemical is being sprayed through opening 30 in a band of the desired width.

When the device of the present invention is used in combination with a planting and cultivating device such as described in applicant's Letters Patent No. 3,128,833 it may be mounted on pontoons A.

What is claimed is:

1. In seed bed shaping devices of the type having bed shaping units including a cover plate and tiller means attached thereto, a front plate extending forwardly and upwardly from said cover plate, said front plate providing an opening therethrough for the application of chemicals on the seed bed in the path to be traversed by said tiller means, a windshield mounted on said front plate in close proximity to said opening and extending upwardly to prevent wind from blowing the chemicals away from said opening, said front plate including a deflection shield extending downwardly and rearwardly forward of said opening.

2. A seed bed shaping and earth tilling device comprising pontoons, said pontoons having a flat bottom and upwardly extending sides whereby said pontoons when drawn through a field shape the bottom of furrows and the sides of seed beds adjacent to said furrows, a cover plate between adjacent pontoons and removably attached thereto, said cover plate having an opening therein, said cover plate having mounted thereon, over said opening, a hood, the top of said hood extending downwardly and rearwardly to a line on the same plane as the plane of said cover plate, earth tilling means mounted within said hood, said earth tilling means extending downwardly through said opening in said cover plate to engage the seed bed.

3. In a device for forming a seed bed simultaneously with adjacent furrows of the type having two furrow-forming units and a generally horizontal cover plate between said furrow-forming units in position to overlie the top of a seed bed between said furrow-forming units, the combination therewith of a tiller mounted on said plate, an opening defined in said plate through which the tiller extends for engagement with the earth of a seed bed, and a hood mounted on said plate enclosing said tiller, said hood extending upwardly from said cover plate and having a top that extends downwardly and rearwardly to the trailing edge of said cover plate to reshape the seed bed after the tilling operation.

4. In a device for forming a seed bed simultaneously with adjacent furrows of the type having two furrrow-forming units and a generally horizontal cover plate between said furrow-forming units in position to overlie the top of a seed bed between said furrow-forming units, the combination therewith of a tiller mounted on said plate, said plate defining an opening therethrough, said tiller being positioned to extend through said opening for engagement with the top of a seed bed, and a hood on said cover plate enclosing said tiller.

References Cited by the Examiner
UNITED STATES PATENTS

| | | | |
|---|---|---|---|
| 2,756,833 | 7/1956 | Chattin | 172—121 X |
| 2,975,842 | 3/1961 | Mostrong | 172—252 |
| 3,087,557 | 4/1963 | Hohstadt | 172—123 X |
| 3,121,973 | 2/1964 | Phillips et al. | 172—175 X |
| 3,128,831 | 4/1964 | Arndt | 172—123 |
| 3,128,833 | 6/1964 | Johnson et al. | 111—85 X |

FOREIGN PATENTS

| | | |
|---|---|---|
| 856,630 | 12/1960 | Great Britain. |
| 1,224,030 | 6/1960 | Italy. |

ABRAHAM G. STONE, *Primary Examiner.*

T. GRAHAM CRAVER, *Examiner.*

J. R. OAKS, *Assistant Examiner.*